(12) United States Patent
Schwantes

(10) Patent No.: US 8,715,544 B2
(45) Date of Patent: May 6, 2014

(54) HYDROPHILIC LIQUID ENCAPSULATES

(75) Inventor: Todd Arlin Schwantes, Lena, WI (US)

(73) Assignee: Appvion, Inc., Appleton, WI (US)

( * ) Notice: Subject to any disclaimer, the term of this patent is extended or adjusted under 35 U.S.C. 154(b) by 372 days.

(21) Appl. No.: 12/973,175

(22) Filed: Dec. 20, 2010

(65) Prior Publication Data

US 2011/0147961 A1    Jun. 23, 2011

Related U.S. Application Data

(60) Provisional application No. 61/288,466, filed on Dec. 21, 2009.

(51) Int. Cl.
*B01J 13/18*    (2006.01)
*B01J 13/02*    (2006.01)
*B32B 5/16*    (2006.01)

(52) U.S. Cl.
USPC ............ 264/4.7; 428/402; 428/403; 428/407; 427/213.3; 427/483

(58) Field of Classification Search
USPC .................... 428/402–402.24, 403, 404, 407; 427/389.9, 213.3–213.36, 483, 256; 264/534, 41, 4–4.7; 424/400, 408, 450, 424/451, 455, 93.7, 184.1, 497, 489, 501, 424/490, 491, 492, 493, 494, 495
See application file for complete search history.

(56) References Cited

U.S. PATENT DOCUMENTS 2,730,456 A    1/1956    Greene et al. ................. 503/214
2,800,457 A    7/1957    Greene et al. .............. 428/402.2

(Continued)

FOREIGN PATENT DOCUMENTS

EP    1 637 188 A1    3/2006
JP    10-294293    10/1998

(Continued)

OTHER PUBLICATIONS

"Microencapsulation" in Kirk-Othmer Encyclopedia of Chemical Technology, Fifth Edition, pp. 438-463.

(Continued)

*Primary Examiner* — James J Seidleck
*Assistant Examiner* — S. Camilla Pourbohloul
(74) *Attorney, Agent, or Firm* — Benjamin Mieliulis

(57) ABSTRACT

A process of forming a population of microcapsules is described comprising a liquid hydrophilic core material and a wall material at least partially surrounding the core material. The liquid hydrophilic core material can be anionic, cationic, or neutral but polar. The microcapsule population is formed by providing liquid hydrophilic core material; providing an oil continuous phase which is low boiling and preferably nonflammable, the oil continuous phase comprising preferably one or more organic oil materials such as esters with chain length up to about 42 carbons. A mixture is formed by dispersing the liquid hydrophilic material in the oil continuous phase. Either an oil soluble or dispersible monofunctional amine acrylate or monofunctional amine methacrylate, along with acid; or alternatively monofunctional acid acrylate or monofunctional acid methacrylate along with base; or alternatively, monofunctional amine acrylate or monofunctional amine methacrylate along with acid acrylate or methacrylate; is added. A multifunctional acrylate or methacrylate monomer or oligomer is provided along with an initiator. Optionally a surfactant is also added to form the mixture. Emulsification is achieved by subjecting the mixture to high shear agitation and heating the mixture for a time sufficient to enable forming a prepolymer which migrates to the liquid hydrophilic material, thereby forming prepolymers adhered to the hydrophilic core materials. Heating is carried out or light exposure or both for a time and temperature sufficient to crosslink the prepolymers.

20 Claims, 1 Drawing Sheet

(56) References Cited

U.S. PATENT DOCUMENTS

| | | | | |
|---|---|---|---|---|
| 2,800,458 A | 7/1957 | Greene et al. | | 428/402.2 |
| 3,516,941 A | 6/1970 | Matson | | 264/4.33 |
| 3,660,304 A | 5/1972 | Matsukawa | | 264/4.3 |
| 3,886,085 A | 5/1975 | Kiritani et al. | | 428/402.21 |
| 3,965,033 A | 6/1976 | Matsukawa et al. | | 264/4.3 |
| 4,001,140 A | 1/1977 | Foris et al. | | 252/316 |
| 4,087,376 A | 5/1978 | Foris et al. | | 252/316 |
| 4,089,802 A | 5/1978 | Foris et al. | | 252/316 |
| 4,093,556 A | 6/1978 | Wojciak | | 252/316 |
| 4,100,103 A | 7/1978 | Foris et al. | | 252/316 |
| 4,105,823 A | 8/1978 | Hasler et al. | | 428/307 |
| 4,166,152 A | 8/1979 | Baker et al. | | 428/522 |
| 4,197,346 A | 4/1980 | Stevens | | 428/307 |
| 4,221,710 A | 9/1980 | Hoshi et al. | | 260/17.3 |
| 4,251,386 A | 2/1981 | Saeki et al. | | 252/316 |
| 4,285,720 A | 8/1981 | Scher | | 71/88 |
| 4,356,109 A | 10/1982 | Saeki et al. | | 252/316 |
| 4,444,699 A | 4/1984 | Hayford | | 264/4.7 |
| 4,547,429 A | 10/1985 | Greiner et al. | | 428/402.24 |
| 4,552,811 A | 11/1985 | Brown et al. | | 428/402.21 |
| 4,588,639 A | 5/1986 | Ozono | | 428/402.22 |
| 4,601,863 A | 7/1986 | Shioi et al. | | 264/4.3 |
| 4,610,927 A | 9/1986 | Igarashi et al. | | 428/402.21 |
| 4,622,267 A | 11/1986 | Riecke | | 428/402.21 |
| 4,708,924 A | 11/1987 | Nagai et al. | | 430/138 |
| 4,908,271 A | 3/1990 | Kasai et al. | | |
| 5,105,823 A | 4/1992 | Hasler et al. | | 128/754 |
| 5,126,061 A | 6/1992 | Michael | | 510/106 |
| 5,292,835 A | 3/1994 | Jahns et al. | | 526/73 |
| 5,407,609 A | 4/1995 | Tice et al. | | 264/46 |
| 5,596,051 A | 1/1997 | Jahns et al. | | 526/73 |
| 6,375,872 B1 | 4/2002 | Chao | | 264/4.33 |
| 6,521,343 B1* | 2/2003 | Samaranayake et al. | | 428/407 |
| 6,531,156 B1 | 3/2003 | Clark | | 424/489 |
| 6,592,990 B2 | 7/2003 | Schwantes | | 428/402.21 |
| 6,780,507 B2 | 8/2004 | Toreki et al. | | 264/4.1 |
| 6,849,591 B1 | 2/2005 | Boeckh et al. | | 510/101 |
| 6,951,836 B2 | 10/2005 | Jahns et al. | | 510/101 |
| 2004/0110898 A1 | 6/2004 | Dreja et al. | | |
| 2004/0197357 A1 | 10/2004 | Heming et al. | | |
| 2006/0248665 A1 | 11/2006 | Pluyter et al. | | 424/401 |
| 2006/0263519 A1* | 11/2006 | Schwantes et al. | | 427/213.3 |
| 2007/0138673 A1 | 6/2007 | Lee et al. | | 264/41 |
| 2009/0274906 A1 | 11/2009 | Schwantes | | |
| 2009/0289216 A1 | 11/2009 | Jung et al. | | 252/79 |
| 2010/0286018 A1 | 11/2010 | Hentze et al. | | 510/299 |
| 2011/0024035 A1 | 2/2011 | Koplin et al. | | 156/330 |

FOREIGN PATENT DOCUMENTS

| | | |
|---|---|---|
| JP | 2002-235483 | 8/2002 |
| JP | 2004-216241 A | 8/2004 |
| WO | WO 01/41915 | 6/2001 |

OTHER PUBLICATIONS

"Capsular Adhesives" in The Journal of the Technical Association of the Pulp and Paper Industry, vol. 49, No. 5 May 1966 pp. 41A-44A.

* cited by examiner

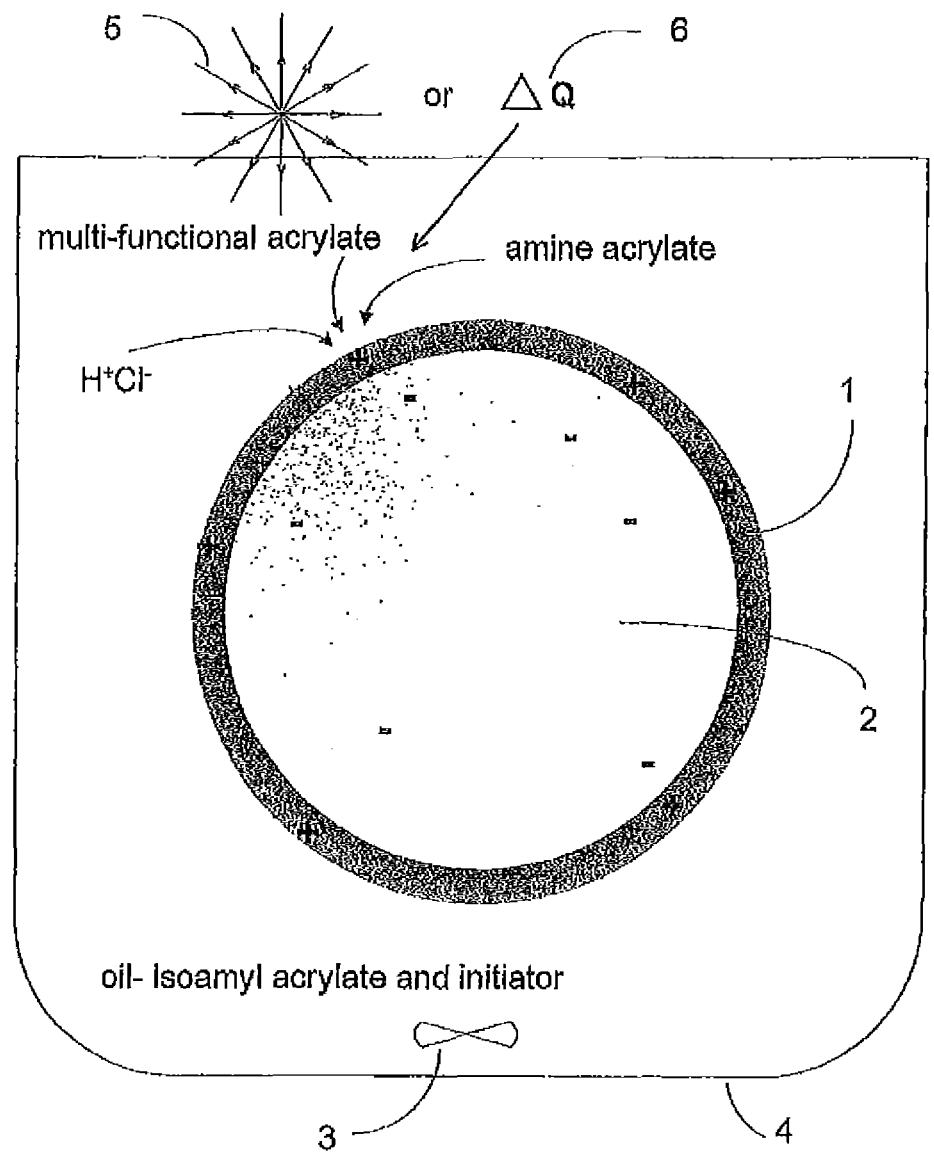

HYDROPHILIC LIQUID ENCAPSULATES

This application being filed under 35 U.S.C. §111(a) claims benefit per 35 U.S.C. §119(e) to application Ser. No. 61/288,466 filed Dec. 21, 2009 as a provisional application per 35 U.S.C. §111(b).

FIELD OF THE INVENTION

This invention relates to capsule manufacturing processes and microcapsules produced by such processes.

DESCRIPTION OF THE RELATED ART

Various processes for microencapsulation, and exemplary methods and materials are set forth in Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat. No. 4,285,720), Shioi et. al. (U.S. Pat. No. 4,601,863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100,103), Greene et. al. (U.S. Pat. Nos. 2,800,458; 2,800,457 and 2,730,456), Clark (U.S. Pat. No. 6,531,156), Saeki et. al. (U.S. Pat. Nos. 4,251,386 and 4,356,109), Hoshi et. al. (U.S. Pat. No. 4,221,710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et. al. (U.S. Pat. No. 4,547,429), and Tice et. al. (U.S. Pat. No. 5,407,609), among others and as taught by Herbig in the chapter entitled "Microencapsulation" in Kirk-Othmer Encyclopedia of Chemical Technology, V. 16, pages 438-463.

More particularly, U.S. Pat. Nos. 2,730,456; 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrene-sulfonic acid. Forming microcapsules from urea-formaldehyde resin and/or melamine formaldehyde resin is disclosed in U.S. Pat. Nos. 4,001,140; 4,081,376, 4,089,802; 4,100,103; 4,105,823; and 4,444,699. Alkyl acrylate-acrylic acid copolymer capsules are taught in U.S. Pat. No. 4,552,811. Each patent described throughout this application is incorporated herein by reference to the extent each provides guidance regarding microencapsulation processes and materials.

Interfacial polymerization is a process wherein a microcapsule wall of a polyamide, an epoxy resin, a polyurethane, a polyurea or the like is formed at an interface between two phases. U.S. Pat. No. 4,622,267 discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429. U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. Urea-formaldehyde (UF), urea-resorcinol-formaldehyde (URF), urea-melamine-formaldehyde (UMF), and melamine-formaldehyde (MF) capsule formations proceed in such manner.

In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization.

Jans et al., U.S. Pat. No. 5,292,835 teaches polymerizing esters of acrylic acid or methacrylic acid with polyfunctional monomers. Specifically illustrated are reactions of polyvinylpyrrolidone with acrylates such as butanediol diacrylate or methylmethacrylate together with a free radical initiator to form capsules surrounding an oil core.

Common microencapsulation processes can be viewed as a series of steps. First, the core material which is to be encapsulated typically on oil is emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the emulsified oil.

In the present invention the core is typically liquid, and more particularly a liquid, especially at room temperature, and constituting a hydrophilic material. Liquid for purposes hereof can include higher viscosity materials and even gels in some embodiments.

Where consistency of wall thickness, uniform deposition, engineering of the wall chemistry, control of release rates, control of charge characteristics, uniform layering, and the like properties are important, the techniques and compositions of the present invention provide a novel process and chemistry to achieve forming a population of microcapsules with an ionic wall material surrounding a liquid hydrophilic core material. With liquids having a gel consistency, it is sufficient if the ionic wall material at least partially surrounds the liquid hydrophilic core material.

BRIEF DESCRIPTION OF THE DRAWING

FIG. 1 is an illustration of one embodiment of microcapsules according to the invention.

DETAILED DESCRIPTION

The present invention discloses a process of forming a population of microcapsules comprising a liquid hydrophilic core material and a wall material at least partially surrounding and preferably completely surrounding the core material. In alternative embodiments the hydrophilic liquid core material is selected to be either anionic, cationic, or neutral but polar. The wall material preferably carries a charge opposite and approximately equal in strength to the charge of the liquid hydrophilic material of the core. In one embodiment the microcapsule population is formed by providing an anionic liquid hydrophilic core material; providing an oil continuous phase which is low boiling and preferably nonflammable, the oil continuous phase comprising an organic oil material up to about 42 carbons in chain length. The oil continuous phase for example can be selected from one or more hydrocarbons, alcohols, arenes, ketones, carboxylates and preferably esters with chain length up to about 18 carbons or even up to about 42 carbons. The microencapsulation process involves forming a mixture by dispersing the liquid hydrophilic material in the oil continuous phase; adding an oil soluble or dispersible monofunctional amine acrylate or methacrylate with a nitrogen content of at least 5% by weight; adding a multifunctional acrylate or methacrylate monomer or oligomer; adding an acid and an initiator; optionally adding a surfactant. In alternative embodiments the acid can be a Lewis acid electron acceptor or even a monofunctional acid acrylate or monofunctional acid methacrylate.

The mixture is dispersed by subjecting the mixture to high shear agitation. The mixture is heated or exposed to actinic radiation or both for a time sufficient to enable the monofunctional amine acrylate or monofunctional amine methacrylate and the multifunctional acrylate or methacrylate to form a prepolymer which migrates to the liquid hydrophilic material, thereby forming prepolymers adhered to the hydrophilic core materials. Heating and/or exposure to actinic radiation is then applied for a time and temperature sufficient to cross link the prepolymers.

In an alternative embodiment, the present invention discloses a process of forming a population of microcapsules comprising a liquid hydrophilic core material and a wall material at least partially surrounding the core material, the microcapsule population being formed by providing an anionic liquid hydrophilic core material; providing an oil continuous phase which is low boiling and preferably nonflammable, the oil continuous phase comprising one or more esters with chain length up to about 18 carbons or even up to 42 carbons or triglycerides (esters of fatty acid of from $C_6$ to $C_{12}$ fatty acids and glycerol); dividing the oil continuous phase into oil 1 and oil 2; dispersing into oil 1 an initiator; dispersing into oil 2 a multifunctional acrylate or methacrylate monomer or oligomer, and an oil soluble or dispersible monofunctional amine acrylate or monofunctional amine methacrylate, and an acid; combining oil 1 and oil 2; forming a mixture by dispersing the liquid hydrophilic material into the oil continuous phase; optionally adding a surfactant, dispersing the mixture by subjecting the mixture to high shear agitation; heating the mixture for a time sufficient to enable the monofunctional amine acrylate or monofunctional amine methacrylate with a nitrogen content of 5% by weight or greater and the multifunctional acrylate or methacrylate to form a cationic prepolymer which migrates to the hydrophilic material, thereby forming prepolymers adhered to the hydrophilic core materials. In alternative embodiments the hydrophilic liquid core material can be selected to be anionic, cationic or neutral but polar.

In a yet further embodiment, in either of the above two processes and resultant capsules, in the steps of adding the monofunctional amine acrylate or monofunctional amine methacrylate and acid, substitution with monofunctional acid acrylate or monofunctional acid methacrylate and base, can be made. The advantage of such substitution is that a liquid hydrophilic core with cationic character, such as materials with amine functionality can be encapsulated by the process.

In a yet further embodiment, the present invention discloses a process of forming a population of microcapsules comprising a liquid anionic hydrophilic core material and a wall material at least partially surrounding the core material, the microcapsule population being formed by providing an anionic hydrophilic liquid core material; providing an oil continuous phase which is low boiling and preferably nonflammable, the oil continuous phase comprising one or more hydrocarbons with chain length up to about 18 carbons. Then, a mixture is formed by dispersing the hydrophilic liquid material in the oil continuous phase; adding an oil soluble or dispersible monofunctional amine acrylate or methacrylate; adding a multifunctional acrylate or monofunctional methacrylate monomer or oligomer; adding an acid and an initiator; and optionally adding a surfactant.

The mixture is emulsified by subjecting the mixture to high shear agitation; heating the mixture for a time sufficient to enable the monofunctional amine acrylate or monofunctional methacrylate, or monofunctional acid acrylate or monofunctional methacrylate, either of the foregoing with a multifunctional acrylate or methacrylate to form a cationic prepolymer which migrates to the emulsified anionic hydrophilic liquid material, thereby forming prepolymers adhered to and surrounding the hydrophilic liquid core material; and heating for a time and temperature sufficient to cross link the prepolymers.

In a yet further embodiment, the present invention discloses a process of forming a population of microcapsules comprising a liquid hydrophilic core material and a wall material at least partially surrounding the core material, the microcapsule population being formed by providing hydrophilic liquid core material providing an oil continuous phase which is low boiling and preferably nonflammable, the oil continuous phase comprising one or more hydrocarbons with chain length up to about 18 carbons. A mixture is formed by adding an oil soluble or dispersible monofunctional acid acrylate or monofunctional acid methacrylate having a —COOH content by weight of 20% or greater; adding a multifunctional acrylate or methacrylate monomer or oligomer; adding a base and an initiator. Optionally a surfactant is added. The mixture is heated in the oil continuous phase for a time and temperature sufficient to form a first prepolymer. The liquid hydrophilic material is dispersed in the oil continuous phase forming a blend. The liquid hydrophilic is emulsified material into the oil continuous phase by subjecting the blend to high shear agitation and the emulsion heated for a time sufficient to enable the monofunctional acid acrylate or monofunctional acid methacrylate and the multifunctional acrylate or methacrylate to form a higher molecular weight prepolymer which migrates to the emulsified liquid hydrophilic material, thereby forming microcapsules comprising the higher molecular weight prepolymer adhered to and surrounding the hydrophilic core material. Heating is carried on for a time and temperature sufficient to cross link the prepolymers.

In a yet further embodiment the present invention discloses a process for forming a population of microcapsules comprising a liquid hydrophilic core material and a wall material at least partially surrounding the core material, the microcapsule population being formed by providing an anionic hydrophilic liquid core material; providing an oil continuous phase which is low boiling and preferably nonflammable, the oil continuous phase comprising one or more hydrocarbons with chain length up to about 18 carbons; dividing the oil continuous phase into oil 1 and oil 2; dispersing into oil 1 an initiator; dispersing into oil 2 a multifunctional acrylate or methacrylate monomer or oligomer, and an oil soluble or dispersible monofunctional amine acrylate or monofunctional amine methacrylate, and an acid; combining oil 1 and oil 2; forming a mixture by dispersing the liquid hydrophilic material into the oil continuous phase; optionally adding a surfactant; emulsifying the mixture by subjecting the mixture to high shear agitation; and heating the mixture for a time sufficient to enable the monofunctional amine acrylate or monofunctional amine methacrylate and the multifunctional acrylate or methacrylate to form a cationic prepolymer which migrates to the anionic liquid hydrophilic material, thereby forming prepolymers adhered to and surrounding the hydrophilic core material.

In yet a further embodiment a process for forming a population of microcapsules comprising a liquid hydrophilic core material and a wall material at least partially surrounding the core material, the microcapsule population being formed by providing a liquid hydrophilic core material; providing an oil continuous phase which is low boiling and preferably non-flammable, the oil continuous phase comprising one or more hydrocarbons with chain length up to about 18 carbons or even up to about 42 carbons; dividing the oil continuous phase into oil 1 and oil 2; dispersing into oil 1 an initiator; dispersing into oil 2 a multifunctional acrylate or methacrylate monomer or oligomer, and an oil soluble or dispersible monofunctional acid acrylate or monofunctional acid methacrylate having a —COOH content by weight of 20% or greater, and a base; combining oil 1 and oil 2; forming a mixture by dispersing the liquid hydrophilic material into the oil continuous phase; and optionally adding a surfactant. The liquid hydrophilic material is emulsified into the oil continuous phase by subjecting the blend to high shear agitation. The emulsion is heated or exposed to actinic radiator a time sufficient to enable the acid acrylate or methacrylate and the multifunctional acrylate or methacrylate to form a higher molecular weight prepolymer which migrates to the emulsified liquid hydrophilic material, thereby forming microcapsules comprising the higher molecular weight prepolymers adhered to and surrounding the hydrophilic core material. Heating is applied or exposure to actinic radiation for a time and temperature sufficient to cross link the prepolymers. In this embodiment the base can be an alkaline material that can donate electrons or hydroxide ions or accept protons.

Alternatively the base can be selected from the group consisting of monofunctional amine acrylate or monofunctional amine methacrylate.

The oil continuous phase is preferably high boiling greater than at least 100° C. and low volatility and preferably nonflammable. The oil continuous phase preferably comprises one or more esters and preferably esters with chain length up to about 18 carbons or even up to about 42 carbons or triglycerides such as esters of $C_6$ to $C_{12}$ fatty acids and glycerol. The soluble acid and the monofunctional amine acrylate or monofunctional amine methacrylate are preferably in a molar proportion from 3:1 to 1:3 and together preferably have a percent by weight as compared to the weight of the wall material of from 0.1 to 20%.

Similarly in embodiments using monofunctional acid acrylate or methacrylate and base, the base and the monofunctional acid acrylate or monofunctional acid methacrylate are preferably in a molar proportion from 3:1 to 1:3 and together preferably have a percent by weight as compared to the weight of the wall material of from 0.1 to 20%

Multifunctional acrylate or methacrylate monomers or oligomers can include mono-; di-; tri-; tetra- penta-; hexa-; hepta-; or octa-functional acrylate esters, methacrylate esters and multi-functional polyurethane acrylate esters and epoxy acrylates stable in the presence of initiator. Monomers shall be understood as including oligomers thereof. Optionally, an inhibitor such as hydroquinone can be added to the monomer and initiator blend in the capsules to prevent premature polymerization.

Useful monomers in the invention are di- and poly-functional acrylate esters, difunctional (meth)acrylate esters, polyfunctional (meth)acrylate esters, difunctional urethane acrylate esters, polyfunctional urethane acrylate esters and polyfunctional and difunctional epoxy acrylate monomers and oligomers used alone or in combination as blends. In alternate embodiments, optionally, the di- and polyfunctional acrylates, methacrylates, urethane acrylates, and epoxy acrylates are further blended with monofunctional acrylates, methacrylates, urethane acrylates and epoxy acrylates.

In an aspect of the invention multi-functional acrylate or methacrylate monomers or oligomers preferably are selected to have a Tg>60° C. in one aspect greater than 70° C., and in another aspect greater than 80° C., and can include by way of illustration and not limitation, allyl methacrylate; triethylene glycol dimethacrylate; ethylene glycol dimethacrylate, diethylene glycol dimethacrylate, aliphatic or aromatic urethane diacrylates, difunctional urethane acrylates, ethoxylated aliphatic difunctional urethane methacrylates, aliphatic or aromatic urethane dimethacrylates, epoxy acrylates, epoxymethacrylates; tetraethylene glycol dimethacrylate; polyethylene glycol dimethacrylate; 1,3 butylene glycol diacrylate; 1,4-butanediol dimethacrylate; 1,4-butaneidiol diacrylate; diethylene glycol diacrylate; 1,6 hexanediol diacrylate; 1,6 hexanediol dimethacrylate; neopentyl glycol diacrylate; polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethylacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate.

Useful monofunctional amines include amine modified acrylate or amine modified methacrylates having a nitrogen content of 5% by weight or greater. The monofunctional amines can include primary, secondary, or tertiary amines. Useful monofunctional amines include alkyl amino acrylates and alkyl amino methacrylates. Preferred was tertiarybutylaminoethyl methacrylate, dimethylaminoethyl methacrylate and diethylaminoethyl methacrylate.

Useful monofunctional acid methacrylates and monofunctional acid acrylates include carboxyalkylacrylates and carboxyalkylmethacrylates. Preferred was beta-carboxyethylacrylate.

The oil soluble acid is preferably an organic acid. The organic acid can be selected from various acids such as carboxy acids, with monoalkyl maleates such as monomethyl, monoethyl or monobutyl maleate being preferred, with monobutyl maleate being most preferred. Yet other organic acids that can be usefully employed in the invention include, organic sulfonic acids such as alkyl benezene sulfonic acid, more particularly linear alkyl benzene sulfonic acid, tridecylbenzene sulfonic acid, more particularly linear trialkyl benzene sulfonic acid such as linear tridecyl benzene sulfonic acid, alkyldiphenyloxide sulfonic acid, preferably dodecyl diphenyl oxidedisulfonic acid, more particularly branched C12 diphenyl oxide disulfonic acid, alkylbenzene sulfonic acid, more particularly, dodecyl benzene sulfonic acid, dialkyl naphthalene disulfonic acid, more particularly dinonylnaphthalene disulfonic acid, 4-hydrozino benzene sulfonic acid acrylic acid, methacrylic acid, and the like. Desirably the organic acid is selected to be dispersible in the oil phase and sparingly soluble in the water phase. The organic acid is used as 0.1 to 20%, preferably 1 to 10.0%, and more preferably 3.0-7.0% by weight based on percentage of total wall. Useful acids also include standard strong acids such as HCl, $H_2SO_4$, and $H_3PO_4$. Acids are hydrogen ion source materials and can include mineral acids, solutions of hydrogen halides, and various materials that increase the concentration of hydrogen ions in solution. In an alternative embodiment the acid can be monofunctional acid acrylate or monofunctional acid methacrylate. Bases when employed include alkaline materials and can include materials that donate electrons or hydroxide ions or accept protons such as alkaline hydroxides including NaOH, $NH_4OH$ or KOH. Bases can include oxides and hydroxides of metals and ammonia. Bases can include other alkaline compounds. In alternative embodiments the base can even be monofunctional amine acrylate or monofunctional amine methacrylate.

Excluding solvent, the primary, secondary or tertiary amine acrylate or methacrylate and the multi-functional acrylate or methacrylate monomers are used in a relative ratio of from about 0.1:99.9 to about 20:80 preferably from about 0.5:99.5 to about 10:90, and most preferably 1:99 to about 5:95.

Low molecular weight secondary or tertiary amines can be also employed as the amine provided they are oil soluble or dispersible.

The initiators are energy activated meaning generating free radicals when subjected to heat or other energy input. Preferred initiators include peroxy initiators, azo initiators, peroxides, and compounds such as 2,2'-azobismethylbutyronitrile, dibenzoyl peroxide. More particularly, and without limitation the free radical initiator can be selected from the group of initiators comprising an azo or peroxy initiator, such as peroxide, dialkyl peroxide, alkyl peroxide, peroxyester, peroxycarbonate, peroxyketone and peroxydicarbonate, 2,2'-azobis (isobutylnitrile), 2,2'-azobis(2,4-dimethylpentanenitrile), 2,2'-azobis (2,4-dimethylvaleronitrile), 2,2'-azobis(2-methylpropanenitrile), 2,2'-azobis (methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di(2-ethylhexanoyl peroxy) hexane, t-amyl peroxy-2-ethylhexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like. Blends of initiators can also be employed. Initiators are available commercially, such as Vazo initiators, which typically indicate a decomposition temperature for the initiator. Preferably the initiator is selected to have a decomposition point of about 50° C. or higher. Usefully multiple initiators are employed, either as a blend in the oil phase, or in either of the oil or water phases. Preferably initiators are selected to stagger the decomposition temperatures at the various steps, pre-polymerization, wall formation and hardening or polymerizing of the capsule wall material. For example, a first initiator in the oil phase can decompose at 55° C., to promote prepolymer formation, a second can decompose at 60° C. to aid forming the wall material. Optionally a third initiator can decompose at 65° C. to facilitate polymerization of the capsule wall material. The total amount of initiator can be typically as low as 0.1 weight percent or as high as 10 weight percent.

The oil continuous phase or oil phase used interchangeably for purposes hereof can be selected from hydrocarbons, more particularly hydrocarbon solvents and the solvents can include by way of illustration and not limitation, ethyldiphenylmethane, butyl biphenyl ethane, benzylxylene, alkyl biphenyls such as propylbiphenyl and butylbiphenyl, dialkyl phthalates e.g. dibutyl phthalate, dioctylphthalate, dinonyl phthalate and ditridecylphthalate; 2,2,4-trimethyl-1,3-pentanediol diisobutyrate, alkyl benzenes such as dodecyl benzene; but also carboxylates, ethers, or ketones such as diaryl ethers, di(aralkyl)ethers and aryl aralkyl ethers, ethers such as diphenyl ether, dibenzyl ether and phenyl benzyl ether, liquid higher alkyl ketones (having at least 9 carbon atoms), alkyl or aralky benzoates, e.g., benzyl benzoate, alkylated naphthalenes such as dipropylnaphthalene, partially hydrogenated terphenyls; high-boiling straight or branched chain hydrocarbons, arenes and alkaryl hydrocarbons such as toluene, vegetable oils such as canola oil, soybean oil, coin oil, sunflower oil, or cottonseed oil, methyl esters of fatty acids derived from transesterification of canola oil, soybean oil, cottonseed oil, corn oil, sunflower oil, pine oil, lemon oil, olive oil, or methyl ester of oleic acid, vegetable oils, esters of vegetable oils, e.g. soybean methyl ester, straight chain saturated paraffinic aliphatic hydrocarbons of from 10 to 13 carbons; $C_8$ to $C_{42}$ esters ethyl hexanoate, methyl heptanoate, butyl butyrate, methyl benzoate, methyl such as nonoate, methyl decanoate, methyl dodecanoate, methyl octanoate, methyl laurate, methyl myristate, methyl palmitate, methyl stearate, ethyl heptanoate, ethyl octanoate, ethyl nonoate, ethyl decanoate, ethyl dodecanoate, ethyl laurate, ethyl myristate, ethyl palmitate, ethyl stearate, isopropyl myristate, isopropyl palmitate, ethylhexyl palmitate, isoamyl laurate, butyl laurate, octyl octanoate, decyl decanoate, butyl stearate, lauryl laurate, stearyl palmitate, stearyl stearate, stearyl behanate, and behenyl behenate. Mixtures of the above can also be employed. Common diluents such as straight chain hydrocarbons can also be blended with the solvents, or blend of solvents. The solvent is selected on the basis of hydrophobicity and ability to disperse or solvate the amine modified vinyl monomer and the multi-functional acrylate or methacrylate monomer or oligomer, and/or the acid acrylate.

Preferably the oil continuous phase comprises one or more esters with chain length of up to about 18 carbons. An example of such an oil continuous phase material is isoamyl benzoate,

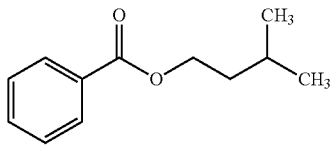

Other preferred oil continuous phase material include $C_{16}$ to $C_{18}$ soy esters.

Lower carbon length esters can also be employed however care must be taken such as with $C_5$ to $C_8$ esters to minimize flammability such as using a nitrogen blanket.

The oil continuous phase can comprise triglycerides such as esters of $C_6$ to $C_{12}$ fatty acids, or even $C_6$ to $C_{18}$ fatty acids, and glycerol. Caproic acid fatty acids, capric fatty acids and caprylic fatty acid triglycerides are preferred. Optionally, the triglycerides can comprise vegetable oils and esters of vegetable oils. The triglycerides can be saturated, unsaturated or polyunsaturated. Polarity increases as unsaturation increases.

In a preferred process the oil continuous phase is divided into two oils, oil 1 and oil 2. The initiator is dispersed in oil 1. Oil 1 and oil 2 can be the same or different. Preferably they are divided portions of the same oil. An initiator is dispersed in oil 1. Into oil 2 a multifunctional acrylate or methacrylate monomer or oligomer, an oil soluble amine acrylate or methacrylate and an acid is dispersed. Optionally the oil soluble amine acrylate or methacrylate and acid is substituted with an acid acrylate or methacrylate and base. Oil 1 and oil 2 are combined. A liquid hydrophilic material is dispersed into any of oil 1, oil 2 or the combined oils. "Dispersing the liquid hydrophilic material into the oil continuous phase" is intended to encompass any or all of these variations.

Optionally a surfactant can be added, selected to have less charge than the liquid hydrophilic material.

After the wall forming materials and liquid hydrophilic core material are dispersed in the oil or oils of the continuous phase and/or oil 1 and oil 2 are combined, along with acid or base respectively depending on whether amine acrylate or methacrylate or acid acrylate or methacrylate is selected as wall forming materials, wall pre-reaction can be carried out by heat or light depending on the initiator employed. Optionally, oil 1 can be heated or subjected to light, depending on the initiator system used, to create a population of free radicals, prior to combining the two oil solutions for wall pre-reaction.

After wall pre-reaction, hydrophilic liquid core is added and the emulsion is milled and heated or UV exposed for a sufficient time to allow wall deposition to proceed. This process is further illustrated and explained in the examples.

In an alternative embodiment, in the first composition, the initiator can be an energy-activated initiator, relying in place of heat or in addition to heat, on light such as a UV or light induced or electron beam induced free radical. Optionally a visible light induced free radical generator could also be used. This dispersion is then subjected to UV light to generate free radicals and initiate polymerization. Depending on the type of initiator or initiators, the dispersion is subjected to UV light and/or heated (as appropriate to the initiator or initiators) to generate free radicals. The term energy activated is intended to encompass heat, or light, UV or visible or infrared, or electron beam activation, without limitation.

As polymerization progresses, microcapsule wall material forms and is drawn to the interface of the hydrophilic core and oil phases. UV exposure and/or heating steps can be used to further polymerize or harden the formed wall material.

UV initiators can include ketone compounds and can include benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; dimethoxyketal; and phenyl glyoxal. 2,2'-diethoxyacetophenone; hydroxycyclohexyl phenyl ketone; alpha-hydroxyketones; alpha-amino-ketones; alpha and beta naphthyl carbonyl compounds; benzoin ethers such as benzoin methyl ether; benzyl; benzil ketals such as benzil dimethyl ketal; acetophenone; fluorenone, 2-hydroxy-2-methyl-1-phenylpropan-1-one. UV initiators of this kind are available commercially, e.g., IRGACURE 184™ or DEROCURE 1173™ from Ciba. Thermal initiators are available from DuPont. The fraction of the photo initiator in any of the water or oil phase is approximately from about 0.1 to 10%, preferably 0.25 to about 6% by weight, more preferably 0.5 to 2.5 weight percent. Similar weight percent ranges can also be applied to the thermal initiators.

UV initiators can be included in substitution as an alternate initiator system (for any heating step or steps of the encapsulation process, or as an additional initiator system). In a yet further embodiment, for specialized microencapsulation processes, the use of initiators, e.g., thioxanthones, phosphine oxides, metallocenes, tertiary aminobenzenes or tertiary aminobenzophenones, which break down into free radicals on exposure to visible light is effectively used. Such microencapsulation systems however typically require special handling of the system to prevent premature polymerization or oligomerization by appropriate control of lighting conditions.

This produces an initiator system for polymerization or oligomerization using a dual cure method or optional thermal or optional light or optional UV initiated method by appropriate selection of initiator and initiation method or methods. In an alternative embodiment of the invention, azo compounds that can be excited or split by UV light or high-energy radiation are used alone or in combination with thermal free radical initiators. In a yet alternative embodiment, the combination of thermal and UV initiators is formed only by azo compounds.

For light activated microencapsulation, the use of UV initiators are preferred, or a combination of UV initiators and thermal free radical initiators. This combination can impart considerable versatility to the microencapsulation steps of the process where any step or steps of the microencapsulation process then can be initiated either by appropriate selection of an initiator decomposing at specific temperatures or decomposing under specific light conditions. This versatility in the selection of initiators also allows sufficient flexibility in the encapsulation system to customize encapsulation conditions for a given core material. For example, highly volatile or heat-sensitive materials may be more effectively encapsulated with minimal heating, through the use of energy-cure methods.

In a yet further embodiment, with appropriate selection of monomers and initiators, the respective monomers in the process can be polymerized or oligomerized using some suitable means such as heat (used with thermal initiators) or UV light (for use with UV initiators), or electron beam. When replacing the UV radiation with electron beam, the addition of initiators is not absolutely essential or amounts employed can be reduced. Options for individual initiation steps of the encapsulation process include the freedom to use in replacement of any heating step, the use of visible light with suitable initiators, the use of UV light with suitable UV initiators, or ionizing radiation (e.g. electron beam or gamma ray) without initiators or reduced amounts of initiator.

UV initiators may be selected from those organic chemical compounds conventionally employed to promote UV-initiated formation of radicals. A preferred UV initiator is 1-hydroxycyclohexyl phenyl ketone because of the rapidity with which it generates free radicals when exposed to UV radiation. Mixtures of UV initiators or mixtures with thermal initiators may also be used. This is often desirable because it provides more efficient production of radicals in certain cases. In general, the UV initiator will be present in an amount of 0.1 to 10.0 weight percent in any of the water or oil phases, based on the total weight of all constituents. However, it is preferable to use between 0.25-2.5 weight percent UV initiator, most preferably 0.5-1.0 weight percent UV initiator, based on total weight.

The amount of each initiator, thermal, UV or light, that is employed can vary, and is dependent upon factors such as the monomer or oligomer material. Typically, the amount of initiator ranges from about 0.1 to about 6 percent, and often about 1 to about 3 percent, based on the weight of all constituents.

A process of microencapsulation based on UV curing has the advantage of allowing the encapsulation of highly volatile or heat sensitive core materials. UV curable wall systems can have lower energy usage than analogous thermal-cured systems. In certain aspects, a UV-curable system has the potential of increased throughput and efficiency through use of photo initiation.

Looking now at FIG. 1, reactor 4 is provided with impeller 3. Optionally, the reactor can be transparent to permit light passage. UV light source 5 is provided and ΔQ indicates a quantity of heat applied to the reactor slurry. The microcapsule is depicted in exaggerated size to help in illustration of the process. The microcapsule population is formed by providing anionic liquid hydrophilic material 2. In an alternative embodiment charges can be the reverse by selecting a cationic, or even nonionic liquid hydrophilic core. If nonionic, treating with surfactant may be necessary to drive wall material to the particle. Hydrophilic material 2 is dispersed and comminuted into the continuous phase oil shown in FIG. 1 as isoamyl benzoate along with an initiator, and preferably a thermal or actinic radiation free radical generator.

A monofunctional amine acrylate and acid, when the liquid hydrophilic core is selected as anionic; or in the case when the liquid hydrophilic core is cationic, a monofunctional acid acrylate and base; are added to and dispersed into the continuous phase oil. Optionally some surfactant can be added along with multifunctional acrylate and the liquid hydrophilic core of desired size. The mixture is further milled if desired and comminuted to desired particle size. UV light radiation such as light source 5 is provided and/or heat quantity 6. In thermally initiated systems a ΔQ heat quantity may be sufficient. ΔQ can be provided in increments to pre-react the polymers and following acid (or base addition) to cure or harden the polymers or pre-polymers as they migrate to the surface of liquid hydrophilic particle 2 to form wall material 1. In this embodiment wall material 1 is depicted as cationic or carrying a level of positive charge. In an alternative embodiment the charges can be reversed with the wall material being anionic and the liquid hydrophilic particle being cationic.

Most hydrophilic liquid cores will typically exhibit anionic character. Optionally, increasing viscosity can render the cores particle-like or gel-like. Cationic hydrophilic liquids can include aminofunctional polymers or resins.

The process and microcapsules according to the invention enable protection of water sensitive materials since the capsules do not come into contact with water during encapsulation. The capsule wall can also provide additional structure to slow release or until later disintegration. The capsule wall can also delay release as a function of wall permeability or provide for release by fracture, pressure, friction, heat, shock, sonics, scraping, and like mechanisms.

Layering of multiple layers onto the liquid hydrophilic particles is also possible by repeated dispersion steps according to the invention. In such fashion hydrophilic and/or relative hydrophobic character can be customized in each layer to provide a membrane effect and/or to control relative observed charge on the external surface of the hydrophilic material before encapsulation or to a customized configuration and charge after encapsulation.

The process of invention can be effectively used to encapsulate various liquid hydrophilic materials including water, water solutions and dispersion of acids or bases, water solutions of salts or ionic materials, water solutions and dispersions of water soluble polymers. The amount of acid, base, salt, ionic material or polymer often can be up to the solubility limit or practical viscosity limit of the material. With super saturated solutions or dispersions higher loadings may also be achievable. Preferably the material dissolved or dispersed in water is from 0.01 to about 80 weight percent, or even from 0.01 to 99.99 weight percent of the core weight.

The liquid hydrophilic material can be conditioned or modified prior to or during emulsification either by adding a surfactant in the emulsification step or by addition of adjuvants to the hydrophilic material to modify the hydrophilic materials' relative hydrophillicity or altering its hydrophobicity.

Surfactants useful in the invention can also be used as a treatment prior to emulsification and prior to dispersion in the continuous phase oil. Hydrophillic character can be increased by treating with surfactants such as sodium dodecyl sulfate or sodium dodecylbenzene sulfate. For modifying relative hydrophobicity, cationic surfactants such as cetyl trimethylammonium bromide can be used.

Encapsulation of hydrophilic liquid with acrylate-wall.

Example 1

Batch TAS1223081

Encapsulation of 20% Sucrose Solution Water

Oil:
9.2 g SR206
1.13 g Beta-C
1.41 g 20% NaOH
350 g Isoamyl Benzoate
0.19 g Irgacure 651
Water Phase:
75 g water
18.75 g sucrose
0.38 g Darocure 1173
Process: Oil added to a 25° C. glass jacketed reactor with mixing at 1000 rpm (1.25" 6-tip star mill) and a nitrogen blanket at least 100 cc/min. the UV lamp was applied for 2 minutes for pre-reaction of the wall material. An additional 0.75 g Irgacure 651 was added to the oil and allowed to dissolve for about 5 minutes. The water phase was added at 1000 rpm, and the speed increased to 2750 for milling. The batch was milled for 60 minutes, then UV applied and milled another 30 minutes. Mixing was then done with a Z-bar mixer at 350 rpm for the duration of the batch. An additional 50 g of Isoamyl Benzoate was added after milling. The batch was subjected to a total of 18 hours of UV. After 15 minutes of UV, dimpled particles were present.

Example 2

Water Core, UV Cured

Oil:
9.2 g SR206
0.75 g Beta-C
0.94 g 20% NaOH
350 g isoamyl benzoate
0.19 g Irgacure 651
Water Phase:
93.75 g water
0.38 g Darocure 1173

The oil solution is added to a 25° C. glass jacketed reactor with mixing at 1000 rpm (6-tip star mill, 1.25" diameter) and a nitrogen blanket applied at 100 cc/min. The UV lamp (200 Watt/inch) is applied for 3 minutes for the pre-reaction. The oil solution is still clear. An additional 0.75 g of Irgacure 651 is added, and allowed to dissolve for about 5 minutes. The water phase is added at 1000 rpm, and rpm is then increased to 2000. After 60 minutes of milling the UV lamp was again applied. Milling was maintained for another 30 minutes with the mill on. Mixing was continued at 350 rpm with a 3" Z-bar mixer, and UV irradiation was continued for another 16 hours. Finished capsules showed well-dimpled surfaces.

Example 3

5% Fumaric Acid Core, High Temperature Batch to Maintain Solubility, UV-Cured

Oil:
10 g SR206
1 g TBAEMA
0.5 g Conc. HCl
250 g isoamyl benzoate
0.2 g Irgacure 651
Water Phase (Kept at 85° C.):
95 g water
5 g fumaric acid
0.4 g Darocure 1173

The oil solution was added to the 85° C. reactor and mixed at 1000 rpm with a 1.25" 6-tip star mill. A nitrogen blanket was applied at 100 cc/min throughout the batch. The UV lamp (200 Watt/inch) was applied for 1 minute, resulting in a slightly cloudy solution. An additional 0.75 g of Irgacure 651 was added and allowed to dissolve for about 5 minutes. The water phase was added with 1000 rpm mixing, and milling was started, at 3000 rpm. After 60 minutes of milling the UV lamp was again applied. Milling continued for another 30 minutes with the UV lamp on. After 30 minutes of UV, dimples particles were present. Mixing was continued with a 3" Z-bar, and the UV irradiation was continued for 16 more hours. Heating was discontinued after the milling was complete.

Example 4

50/50 Glycerin/Water, Thermal Reaction

Oil 1:
50 g Captex 355
10 g SR206
0.5 g TBAEMA
0.25 g Conc. HCl
Oil 2:
100 g Captex 355
0.5 g Vazo-52
0.5 g Vazo-67
Core:
50 g water
50 g glycerin
0.5 g Vazo-68WSP
0.5 g 20% NaOH Oil 2 was placed in a 35° C. jacketed steel reactor with a nitrogen blanket applied at 100 cc/minute and mixing at 1000 rpm with a 4-tip flat mill blade (2" diameter). The oil was heated to 75° C. in 45 minutes, held at 75° C. for 45 minutes, and cooled to 60° C. in 75 minutes. Oil 1 was added at 60° C. (SR206 added to oil 1 30 minutes before use). The combined oils were held for an additional 10 minutes at 60° C. The core was added with 1500 rpm mixing, and the rpm was increased to 2500 for milling. At the start of milling the temperature was increased to 75° C. (over the next 1 hour). After mixing at 75° C. for 2.5 hours, dimpled capsules were evident and mixing was continued at 300 rpm with a 3" Z-bar. After a total of 4 hours at 75° C., the batch was increased to 90° C. in 30 minutes and held at 90° C. for 8 hours.

Example 5

20% Sucrose in Water, TBAEMA/Beta-C Formulation

Oil:
12.25 g SR206
1.5 g TBAEMA
1.5 g Beta-C
350 g Isoamyl benzoate
0.25 g Irgacure 651
Water Phase:
100 g water
25 g sucrose
0.5 g Darocure 1173

The oil phase was added to a 25° C. glass jacketed reactor with mixing at 1000 rpm (1.25" 6-tip star mill) and with a nitrogen blanket at 100 cc/minute. The UV lamp (200 Watt/inch) was applied to the oil solution for 2 minutes. The oil was very slightly cloudy after UV. An additional 1 g of Irgacure 651 was added and allowed to dissolve for about 5 minutes. The water phase was added at 1000 rpm and the rpm was then increased to 2750 for milling. After 60 minutes of milling the UV lamp was again applied. The UV was continued along with milling for an additional 30 minutes. Mixing was continued with a 3" Z-bar for the duration of the batch. UV was applied to the batch for a total of 18 hours. The final batch contained smooth-walled capsules with single dimples.

Unless otherwise indicated, all measurements herein are on the basis of weight and in the metric system. All references cited herein are expressly incorporated herein by reference.

The abbreviations correspond to the following materials:

|  | Company/City |  |
| --- | --- | --- |
| SR206 | Sartomer Company, Exton, PA | Ethyleneglycol dimethacrylate |
| Vazo-52 | DuPont, Wilmington, DE | 2,2'-Azobis (2,4-Dimethylvaleronitrile) |
| Vazo-67 | DuPont, Wilmington, DE | 2,2'-Azobis (2-Methylbutyronitrile) |
| Vazo-68WSP | DuPont, Wilmington, DE | 4,4'-Azobis (4-Cyanovaleric Acid) |
| Irgacure 651 | CIBA, Tarrytown, NY | 2,2-Dimethoxy-1,2-Diphenylethan-1-one |
| Darocure 1173 | CIBA, Tarrytown, NY | 2-Hydroxy-2-Methyl-1-Phenyl-Propane-1-one |
| IAB | Sigma-Aldrich, Milwaukee, WI | isoamyl benzoate |
| Beta-C | Bimax | Beta hydroxyethylacrylate |
| TBAEMA | Evonik CYRO LLC, Parsippany, NJ | Tertiarybutylaminoethyl methacrylate |

All documents cited in the specification herein are, in relevant part, incorporated herein by reference for all jurisdictions in which such incorporation is permitted. The citation of any publication is for its disclosure prior to the filing date and should not be construed as an admission that such publication is prior art or that the present invention is not entitled to antedate such publication by virtue of prior invention. To the extent that any meaning or definition of a term in this document conflicts with any meaning or definition of the same term in a document incorporated by reference, the meaning or definition assigned to that term in this document shall govern.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. No unclaimed language should be deemed to limit the invention in scope. Any statements or suggestions herein that certain features constitute a component of the claimed invention are not intended to be limiting unless reflected in the appended claims.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive variations and charges can be made by those skilled in the art without departing from the spirit and scope of the invention.

What is claimed is:

1. A process for forming a population of microcapsules comprising a liquid hydrophilic core material and a wall material at least partially surrounding the core material, the microcapsule population being formed by:
   providing a hydrophilic liquid core material;
   providing an oil continuous phase which is low boiling and preferably nonflammable, the oil continuous phase comprising one or more of an organic oil material with chain length up to about 42 carbons;
   dividing the oil continuous phase into oil 1 and oil 2;
   dispersing into oil 1 an initiator;
   dispersing into oil 2 a multifunctional acrylate or methacrylate monomer or oligomer, and an oil soluble or dispersible monofunctional amine acrylate or monofunctional amine methacrylate, and an acid;
   combining oil 1 and oil 2;
   forming a mixture by dispersing the liquid hydrophilic material into the oil continuous phase;
   optionally adding a surfactant;
   emulsifying the mixture by subjecting the mixture to high shear agitation;
   heating the mixture for a time sufficient to enable the monofunctional amine acrylate or monofunctional amine methacrylate and the multifunctional acrylate or methacrylate to form a cationic prepolymer which migrates to the liquid hydrophilic material, thereby forming prepolymers adhered to and surrounding the hydrophilic core material, wherein the acid and monofunctional amine acrylate or monofunctional amine methacrylate have a molar proportion of from 3:1 to 1:3.

2. The process of forming a population of microcapsules according to claim 1 wherein the acid and monofunctional amine acrylate or monofunctional amine methacrylate have a percent by weight as compared to weight of the wall material of from 0.1 to 20 percent.

3. The process of forming a population of microcapsules according to claim 1 wherein the monofunctional amine is selected from the group consisting of alkyl amino acrylate and alkylaminomethacrylate.

4. The process of forming a population of microcapsules according to claim 1 wherein the monofunctional amine is tertiarybutylaminoethyl methacrylate dimethylaminoethyl methacrylate or diethylaminoethylmethacrylate.

5. The process of forming a population of microcapsules according to claim 1 wherein the acid and monofunctional amine acrylate or monofunctional amine methacrylate have a molar proportion of from 1.25/1 to about 1/1.25.

6. The process of forming a population of microcapsules according to claim 1 wherein the acid is an organic acid which is substantially water insoluble and is selected from the group consisting of monoalkylmaleates, alkyl benzene sulfonic acid, and trialkylbenzene sulfonic acid.

7. The process of forming a population of microcapsules according to claim 1 wherein the acid is selected from the group consisting of a monofunctional acid acrylate and monofunctional acid methacrylate.

8. The process for forming a population of microcapsules according to claim 1 wherein the organic oil material is selected from the group consisting of hydrocarbons, alcohols, arenes, ketones, carboxylates and esters.

9. The process of forming a population of microcapsules according to claim 1 wherein the acid is a Lewis acid electron acceptor.

10. The process of forming a population of microcapsules according to claim 1 wherein the hydrophilic liquid core material is selected from the group consisting of anionic, cationic, or neutral but polar material.

11. A process for forming a population of microcapsules comprising a liquid hydrophilic core material and a wall material at least partially surrounding the core material, the microcapsule population being formed by:
providing a liquid hydrophilic core material;
providing an oil continuous phase which is low boiling and preferably nonflammable, the oil continuous phase comprising one or more organic oil material with chain length up to about 42 carbons;
dividing the oil continuous phase into oil 1 and oil 2;
dispersing into oil 1 an initiator;
dispersing into oil 2 a multifunctional acrylate or methacrylate monomer or oligomer, and an oil soluble or dispersible monofunctional acid acrylate or monofunctional acid methacrylate having a —COOH content by weight of 20% or greater, and a base;
combining oil 1 and oil 2;
forming a mixture by dispersing the liquid hydrophilic material into the oil continuous phase;
optionally adding a surfactant,
emulsifying the liquid hydrophilic liquid material into the oil continuous phase by subjecting the blend to high shear agitation;
heating the emulsion for a time sufficient to enable the acid acrylate or methacrylate and the multifunctional acrylate or methacrylate to form a higher molecular weight prepolymer which migrates to the emulsified liquid hydrophilic material, thereby forming microcapsules comprising the higher molecular weight prepolymers adhered to and surrounding the hydrophilic core material;
heating for a time and temperature sufficient to crosslink the prepolymers.
wherein the base and monofunctional acid acrylate or monofunctional acid methacrylate have a molar proportion of from 3:1 to 1:3.

12. The process of forming a population of microcapsules according to claim 11 wherein the base and monofunctional acid acrylate or monofunctional acid methacrylate have a percent by weight as compared to weight of the wall material of from 0.1 to 20 percent.

13. The process according to claim 11 wherein the organic oil material of the oil continuous phase are esters.

14. The process of forming a population of microcapsules according to claim 11 wherein the monofunctional acid acrylate or monofunctional acid methacrylate is carboxyalkyl acrylate or carboxyalkyl methacrylate.

15. The process for forming a population of microcapsules according to claim 11 wherein the monofunctional carboxyalkyl acrylate is beta-carboxyethylacrylate.

16. The process of forming a population of microcapsules according to claim 11 wherein the base is an alkaline material that can donate electrons or hydroxide ions or accept protons.

17. The process of forming a population of microcapsules according to claim 11 wherein the base is selected from the group consisting of monofunctional amine acrylate or monofunctional amine methacrylate.

18. The process of forming a population of microcapsules according to claim 11 wherein the hydrophilic liquid core material is selected from the group consisting of anionic, cationic, or neutral but polar material.

19. The process of forming a population of microcapsules according to claim 1, or 11 wherein the oil continuous phase is selected to be

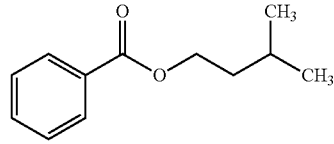

or, triglycerides of $C_6$ to $C_{18}$ fatty acids.

20. The process of forming a population of microcapsules according to claim 1 or 11 wherein crosslinking the prepolymers is accomplished by heating the mixture or exposing the mixture to actinic radiation or both.

* * * * *